Patented Feb. 9, 1926.

1,572,065

UNITED STATES PATENT OFFICE.

NORRIS BOEHMER, OF MONTCLAIR, NEW JERSEY, ASSIGNOR TO CHADELOID CHEMICAL COMPANY, A CORPORATION OF WEST VIRGINIA.

RESINOUS COMPOSITION CONTAINING CHLORINATED RUBBER.

No Drawing. Application filed October 11, 1923. Serial No. 667,891.

*To all whom it may concern:*

Be it known that I, NORRIS BOEHMER, a citizen of the United States, and a resident of Montclair, in the county of Essex and State of New Jersey, have invented certain new and useful Improvements in Resinous Composition Containing Chlorinated Rubber, of which the following is a specification.

This invention relates to a resinous composition containing chlorinated rubber and relates particularly to a composition comprising chlorinated rubber and cumaron resin which is suitable for making liquids for coating purposes.

Cumaron resin is unsaponifiable; that is, it is not appreciably attacked by alkalies and also is resistant to the action of many of the common acids such as sulphuric, nitric, hydrochloric, etc. The brittleness of the material especially in the harder grades however limits its usefulness in coatings such as varnishes where durability and resistance to abrasion are required. Chlorinated rubber is also markedly resistant to the action of the acids and alkalies and in addition possesses a substantial toughness. While chlorinated rubber, especially the more highly chlorinated grades, is much more readily soluble than raw or untreated rubber, solutions of chlorinated rubber are much more viscous than those of many resins and therefore the amount of chlorinated rubber which can be put into solution without giving too great a viscosity is limited. In preparing coating compositions and the like it is desirable that as high a percentage of solids as is possible be employed in order to reduce the number of coats necessary to be applied. Cumaron resin yields solutions much less viscous than chlorinated rubber at similar concentrations.

The combination of cumaron resin and chlorinated rubber possesses desirable chemical resistance coupled with the necessary mechanical strength and is capable of being formed into a solution with a suitable proportion of solids and desirably low viscosity.

The chlorinated rubber which is preferably employed for the purpose herein described is a very highly chlorinated grade containing more than 67 per cent by weight of combined chlorine. This material may be made by treating raw crêpe rubber with chlorine under high pressure preferably at some what elevated temperatures. The solubility of this highly chlorinated material is much greater than that of grades containing less chlorine and solutions of high concentration can therefore be made up without obtaining too great viscosity. However for certain purposes other chlorinated rubber containing a lesser amount of chlorine than that mentioned is suitable and it may be desirable to use material of this sort in some cases. The harder grade of cumaron resin known commercially as "varnish grade" is best adapted for use in combination with chlorinated rubber. Softer grades however may be used when their special properties are desired.

The composition herein described is adapted for use in solution and suitable solvents are the aromatic hydrocarbons such as benzol, toluol, xylol, solvent naphtha and mixtures of these. Carbon bisulphide, carbon tetrachloride and other chlorinated hydrocarbons of both the aliphatic and aromatic series may also be used. When a quick-drying composition is desired benzol is preferable and other less volatile hydrocarbons may be used in order to delay drying if desired.

A composition made as herein described may contain 3 parts of cumaron resin to 1 part of chlorinated rubber. When these proportions are used a solution may readily be formed containing 50 per cent or more of solids. Other proportions of chlorinated rubber and cumaron resin may be employed, a larger proportion of chlorinated rubber increasing the toughness of the film resulting from evaporation of the solvent and also somewhat improving its resistance to acids especially nitric acid. When a composition containing equal parts of cumaron resin and chlorinated rubber is used a solution containing 40 per cent of solids is suitable. Other proportions of solvents and solids than those heretofore mentioned may be employed when the purpose for which the composition is used so indicates.

The compositions described in the foregoing are useful as coatings or paints for concrete being resistant to or unattacked by the alkalies present therein. They are also desirable for coating other surfaces which may be exposed to the action of chemicals.

What is claimed is:—

1. A coating composition comprising chlorinated rubber and at least an equal amount of cumaron resin, and a solvent for said materials.

2. A composition comprising cumaron resin and a smaller proportion of chlorinated rubber.

3. A resinous composition comprising chlorinated rubber, containing over 60% of chlorin, cumaron resin and a solvent for said materials.

NORRIS BOEHMER.